(12) United States Patent
Muto et al.

(10) Patent No.: US 8,801,045 B2
(45) Date of Patent: Aug. 12, 2014

(54) PIPE JOINT

(75) Inventors: Masaaki Muto, Tsukubamirai (JP);
Hiroshi Hanne, Tsukubamirai (JP);
Kouichirou Ishibashi, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 598 days.

(21) Appl. No.: 12/993,201

(22) PCT Filed: Jun. 12, 2008

(86) PCT No.: PCT/JP2008/060786
§ 371 (c)(1),
(2), (4) Date: Nov. 17, 2010

(87) PCT Pub. No.: WO2009/150738
PCT Pub. Date: Dec. 17, 2009

(65) Prior Publication Data
US 2011/0062704 A1 Mar. 17, 2011

(51) Int. Cl.
*F16L 35/00* (2006.01)
(52) U.S. Cl.
USPC .............................................. 285/39; 285/322
(58) Field of Classification Search
USPC .................................... 285/243, 321–322, 39
See application file for complete search history.

(56) References Cited

U.S. PATENT DOCUMENTS

| | | | | |
|---|---|---|---|---|
| 4,630,848 A | * | 12/1986 | Twist et al. | 285/308 |
| 4,712,810 A | * | 12/1987 | Pozzi | 285/93 |
| 5,292,157 A | * | 3/1994 | Rubichon | 285/39 |
| 5,722,696 A | * | 3/1998 | Taneya | 285/39 |
| 6,312,019 B1 | | 11/2001 | Nakazumi et al. | |
| 6,869,109 B2 | | 3/2005 | Matsushita | |

FOREIGN PATENT DOCUMENTS

| | | |
|---|---|---|
| DE | 197 45 604 C1 | 10/1998 |
| JP | 10 299957 | 11/1998 |
| JP | 2003 28371 | 1/2003 |
| JP | 2007 16820 | 1/2007 |

OTHER PUBLICATIONS

International Search Report issued Jul. 8, 2008 in PCT/JP08/060786 filed Jun. 12, 2008.
U.S. Appl. No. 12/992,717, filed Nov. 15, 2010, Muto, et al.
German Office Action issued on Mar. 2, 2011 to German Patent Application No. 11 2008 003 869.4-24, with English translation.

* cited by examiner

*Primary Examiner* — Aaron Dunwoody
(74) *Attorney, Agent, or Firm* — Oblon, Spivak, McClelland, Maier & Neustadt, L.L.P.

(57) ABSTRACT

In a pipe joint, a release bush includes a cylindrical portion and a flange portion for pressing, provided along an outer edge of the cylindrical portion. A movable portion including a part of the flange portion and a part of the cylindrical portion is formed to move with respect to a main portion including the remaining part of the flange portion and the remaining part of the cylindrical portion, via an elastically deformable portion. The cylindrical portion of the movable portion can be moved to be aligned with the cylindrical portion of the main portion along the same circumference, by an external operating force exerted on the movable portion, while the movable portion remains in a position opposing a main body of the pipe joint when an operating force is not applied, thereby inhibiting the release bush from being pressed into a chuck despite the flange portion being pressed.

11 Claims, 7 Drawing Sheets

PIPE JOINT

TECHNICAL FIELD

The present invention relates to a pipe joint that connects a hydraulic apparatus and a piping tube in a pneumatic circuit or the like.

BACKGROUND ART

A pipe joint for connecting a hydraulic apparatus and a piping tube in a pneumatic circuit or the like, that includes a fluid channel formed through a central portion of its main body and in which a tube retention mechanism and a release bush are mounted, is widely known and therefore citing a specific example is unnecessary. The tube retention mechanism is attached to an end portion of the fluid channel, and includes a chuck with a latch claw to be engaged with the outer circumferential surface of a tube inserted therein so as to retain the tube, and the release bush serves to disengage the chuck from the tube upon being pressed into the chuck, thereby allowing the tube to be removed.

In the pipe joint thus configured, the release bush effectively works for the removal of the tube in the case, for example, where the tube has to be removed for modifying the pipe connection or correcting erroneous piping. However, there are sites where the pipe connection is rarely modified after once properly connecting the piping tube to the hydraulic apparatus and, moreover, since the release bush is located at a position where it can be easily accessed, the release bush of the properly connected pipe joint is prone to be accidentally pressed resulting in removal of the properly connected piping tube, during such work as connecting or disconnecting a tube to or from another pipe joint close to the properly connected pipe joint.

DISCLOSURE OF THE INVENTION

Problems to be Solved by the Invention

An object of the invention is to provide a pipe joint that prevents the release bush from being accidentally pressed so that the tube is removed, and that inhibits the tube from being removed from the pipe joint unless a worker uses a predetermined tool with the intention of removing the tube from the pipe joint, yet allows the worker to remove the tube by performing a simple operation.

Means for Solving the Problems

In order to solve the above problem, a pipe joint of the present invention including a tube retention mechanism provided at an end portion of a fluid channel formed through a main body of the pipe joint, the tube retention mechanism including a chuck with a latch claw to be engaged with an outer circumferential surface of a tube inserted into the fluid channel so as to retain the tube; a release bush to be inwardly pressed into the chuck to disengage the chuck from the tube thereby allowing the tube to be removed, wherein the release bush includes a cylindrical portion corresponding to an outer circumference of a tube insertion clearance in the main body and a flange portion for pressing formed along an outer edge of the release bush and located outside the main body, the cylindrical portion and the flange portion being integrally formed of a synthetic resin; a part of the flange portion and a part of the cylindrical portion constitute a movable portion that can move with respect to a main portion including the remaining part of the flange portion and of the cylindrical portion via an elastically deformable portion; when an external operating force is exerted on the movable portion, the cylindrical portion thereof can be moved so as to be aligned with the cylindrical portion of the main portion along the same circumference; and when the movable portion is free from an operating force, the cylindrical portion thereof is located in a radially outer region of the cylindrical portion of the main portion so as to oppose the main body, thereby inhibiting the release bush from being pressed into the chuck despite the flange portion being pressed.

In a preferred embodiment, the movable portion and the main portion may be partially separated from each other via a slit formed in a circumferential direction at least along the cylindrical portion, such that a distal end portion of the cylindrical portion of the movable portion defined by the slit is located at a position opposing the main body when an operating force is not applied.

In the pipe joint thus configured, the movable portion of the release bush may be connected to the main portion so as to radially move with respect thereto, via the elastically deformable portion provided on the flange portion or the cylindrical portion.

Also, the cylindrical portion of the movable portion may be formed so as to remain outwardly inclined with respect to the cylindrical portion of the main portion when an operating force is not applied, and the movable portion may be connected to the main portion so as to rotationally move with respect thereto via the elastically deformable portion provided on the flange portion or the cylindrical portion.

It is preferable to form the movable portions on a plurality of positions symmetrically located around the release bush. In the case where the movable portions are thus located on the plurality of positions around the release bush, a flange portion of a part of the movable portions may be located inside a narrow recess that inhibits access to the flange portion by a finger, which substantially minimizes the risk that the tube T is removed because of an improper operation.

With the pipe joint configured as above, even though the release bush is subjected to a force exerted in a direction to press the release bush into the main body (direction to remove the tube), for example by the worker's hand or another object, the movable portion of the release bush is made to abut the main body so as to prevent the cylindrical portion of the release bush from being pressed into the tube insertion clearance in the main body, thereby preventing the chuck from being disengaged from the tube, thus preventing the tube from being accidentally removed.

On the other hand, upon holding the flange portions of the movable portion with the fingers or a tool thereby moving the cylindrical portion of the movable portion so as to be aligned with the cylindrical portion of the main portion along the same circumference, and then pressing the flange portion toward the main body keeping the flange portions held as above, the movable portion is kept from abutting the main body, so that the cylindrical portion of the release bush can be pressed into the tube insertion clearance, thereby disengaging the chuck from the outer circumferential surface of the tube and allowing the tube to be easily removed from the main body.

Advantages

The foregoing pipe joint according to the invention prevents the release bush from being accidentally pressed so that the tube is removed, and the tube cannot be removed unless the worker performs a predetermined operation with the intention of removing the tube from the pipe joint. However, removal with a predetermined tool can be easily carried out.

REFERENCE NUMERALS 1 main body
2 tube retention mechanism
5 release bush
7 pressing tool
11 fluid channel
13 tube insertion clearance
21 chuck
24 latch claw
51, 51a, 51b cylindrical portion
52, 52a flange portion
52b narrow recess
53 main portion
54, 54a movable portion
55 elastically deformable portion
56 slit
T tube

BEST MODES FOR CARRYING OUT THE INVENTION

Figure 1:
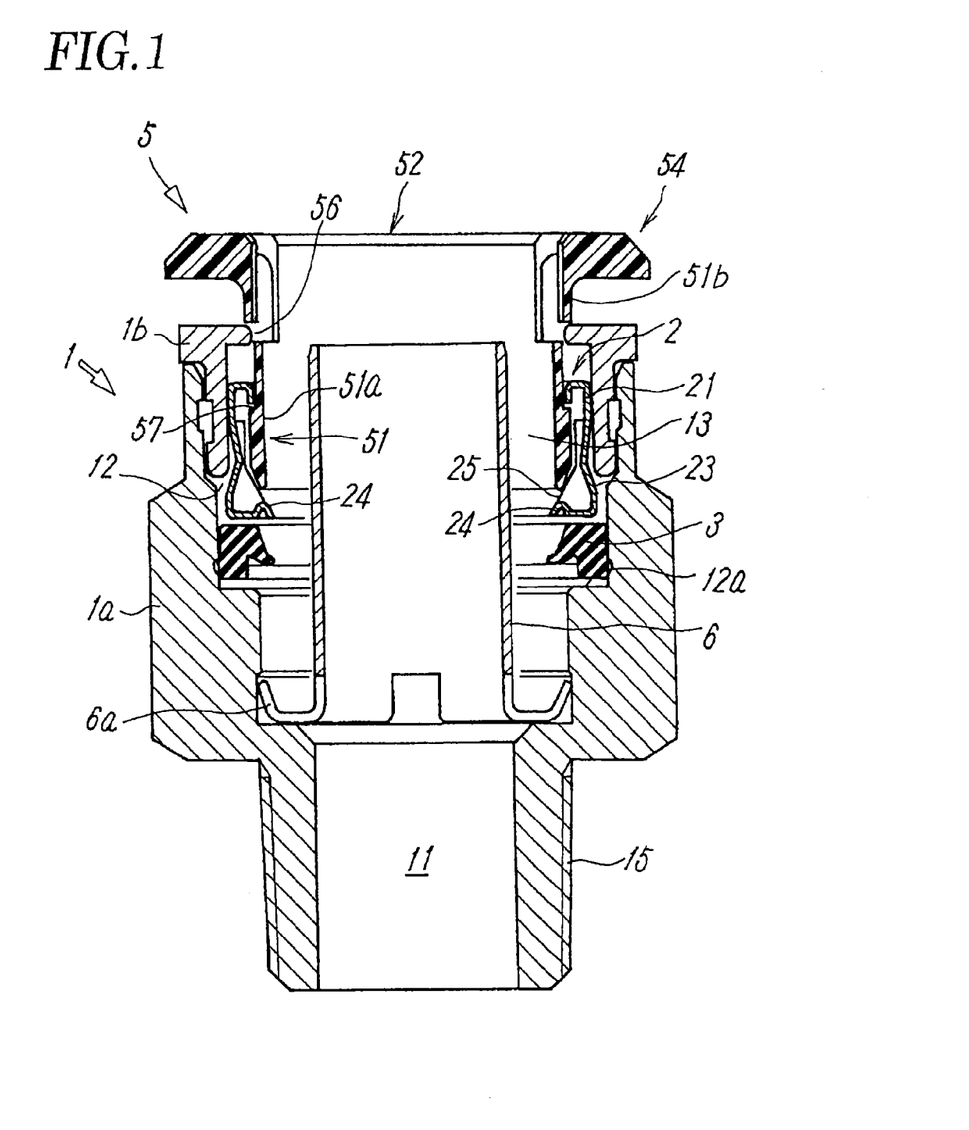
FIG. 1 is a vertical cross-sectional view of a pipe joint according to a first embodiment of the invention.
Figure 2:
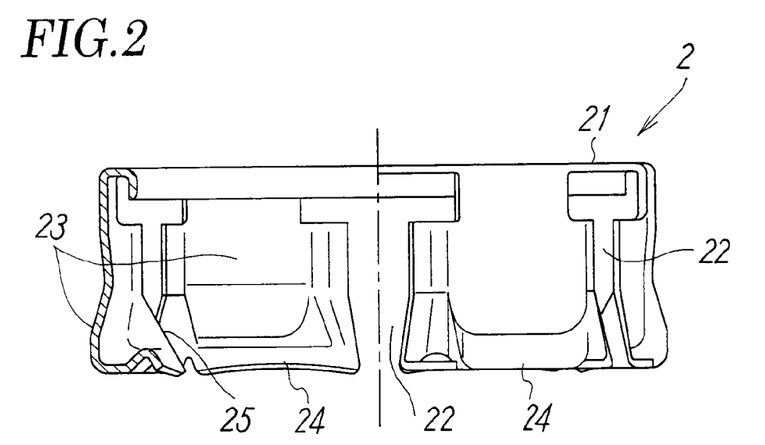
FIG. 2 is a partially cross-sectional front view of a tube retention mechanism employed in the first embodiment and a second embodiment.
Figure 3:
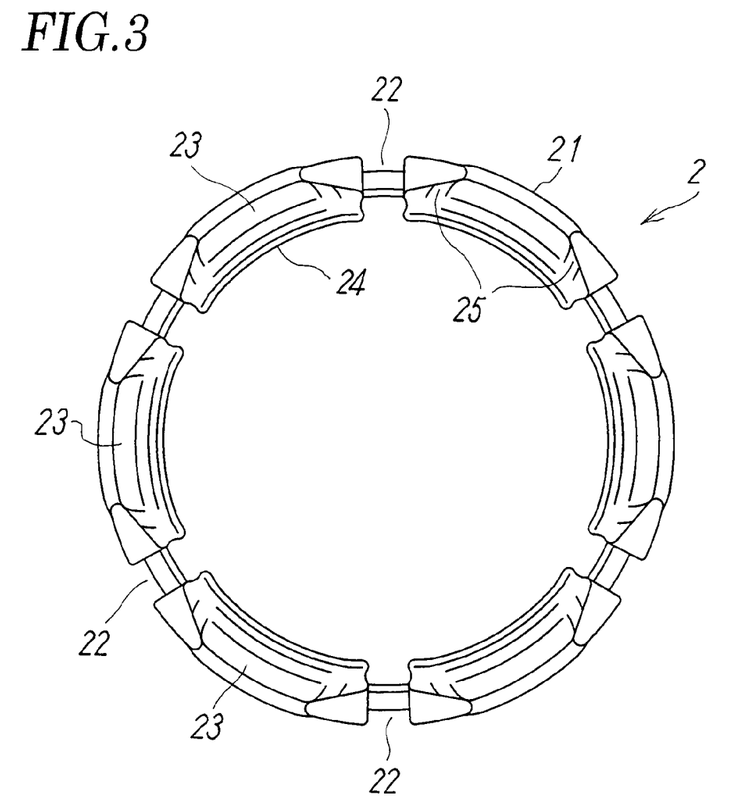
FIG. 3 is a bottom view of the same.

FIG. 1 depicts a pipe joint according to a first embodiment of the invention; FIGS. 2 and 3 show details of a tube retention mechanism employed in the first embodiment; and FIGS. 4 and 5(a) to 5(c) show detailed configuration of a release bush employed in the first embodiment.

In outline, the pipe joint according to the first embodiment includes a main body 1 constituting the outer shell of the pipe joint, a tube retention mechanism 2 mounted in the main body 1 for retaining an end portion of a tube T, an elastic seal member 3 provided inside the main body 1, a release bush 5 that serves to disengage the tube retention mechanism 2 from the tube T thereby retained, and a receiving tube 6 that receives the tube T inserted in the main body 1 upon fitting the end portion of the tube T onto the receiving tube 6.

The main body 1 includes a fluid channel 11 formed so as to penetrate therethrough along an axial center thereof, so that a fluid can flow between the tube T and a hydraulic apparatus to which the tube T is connected. The main body 1 also includes a guide member 1b with a flange formed at an end portion thereof, press-fitted to an end portion of a main portion 1a of the main body 1 through which the fluid channel 11 is provided, and the guide member 1b thus press-fitted defines a larger-diameter region 12 around the fluid channel 11 inside the main portion 1a. A deeper portion of the larger-diameter region 12 serves as a location for the seal member 3 while a portion thereof closer to the guide member 1b for the tube retention mechanism 2, and a space between these locations and the fluid channel 11 constitutes an insertion clearance 13 for the tube T. The outer circumferential surface of the other end portion of the main body 1 is formed as a mounting screw 15 for connection to the hydraulic apparatus.

The elastic seal member 3 provided inside the larger-diameter region 12 is located between the tube retention mechanism 2 and a stepped portion 12a in the larger-diameter region 12, so as to enter into contact with the outer circumferential surface of the tube T inserted in the insertion clearance 13 around the fluid channel 11, thereby serving as a seal between the outer circumferential surface of the tube T and the inner wall of the larger-diameter region 12. The elastic seal member 3 contributes to minimizing a leak between the tube T and the fluid channel 11 in the main body 1.

The tube retention mechanism 2 is constituted of a metal chuck 21 including a plurality of latch claws 24 to be engaged with the outer circumferential surface of the tube T inserted in the main body 1. The chuck 21 includes, as shown in FIGS. 2 and 3, a plurality of slits 22 formed on an end portion of a cylindrical member made of a metal plate, and the slits 22 define a plurality of elastic elements 23 that are radially elastic, aligned along the circumference of the cylindrical member. The tip portion of the respective elastic elements 23 oriented to a deeper portion of the tube insertion clearance 13 is inwardly bent so as to form the latch claw 24 projecting into the tube insertion clearance 13, and the elastic elements 23 each include a sloped pressing element 25 that press-opens the latch claw 24 engaged with the outer circumferential surface of the tube T, when a cylindrical portion 51 (to be described later) of the release bush 5 for disengaging the chuck 21 from the tube T is inserted in the chuck 21 and the cylindrical portion 51 of the release bush 5 is pressed against the sloped pressing element 25. Here, the chuck 21 may be held by a collet (not shown) if need be.

The receiving tube 6, on which the end portion of the tube T inserted in the main body 1 is to be fitted, constitutes a partition between the fluid channel 11 and the tube insertion clearance 13, and includes a flange portion 6a formed by partially bending outwardly an end portion of a metal tube. The flange portion 6a is made to abut the inner end of the tube insertion clearance 13, so that the receiving tube 6 is elastically retained inside the main portion 1a of the main body 1 via the portion of the receiving tube 6 around the flange portion 6a. The receiving tube 6 serves to stabilize the position of the end portion of the tube T fitted thereon, and extends from the flange portion 6a at least to a position opposing the latch claw 24 of the chuck 21, so as to sustain a radial pressure applied to the tube T by the latch claw 24, thereby stabilizing the engagement therebetween.

The release bush 5, with its cylindrical portion 51 inserted between the tube insertion clearance 13 and the chuck 21 inside the main body 1, is configured as shown in FIGS. 4 and 5(a) to 5(c), and basically includes the cylindrical portion 51 formed so as to correspond to the outer circumference of the tube insertion clearance 13 in the main body 1, and a flange portion 52 for pressing formed along an outer edge of the release bush 5 and located outside the main body 1, and the cylindrical portion 51 and the flange portion 52 are integrally formed of a synthetic resin.

Here, the latch claw 24 of the chuck 21 engaged with the outer circumferential surface of the tube T is not disengaged therefrom, unless the flange portion 52 is pressed so as to inwardly press the tip portion of the cylindrical portion 51 into the chuck 21, so that the cylindrical portion 51 press-opens the sloped pressing element 25 of the elastic elements 23 of the chuck 21. Also, the release bush 5 is engaged, when inserted in the main body 1, with a folded portion formed at the upper end of the chuck 21 via a stepped portion 57 formed on the outer surface of the cylindrical portion 51, and is hence prevented from coming off from the main body 1.

The release bush 5 includes a pair of movable portions 54, constituted of a part of the cylindrical portion 51 and of the flange portion 52 of the release bush 5 and symmetrically located on a main portion 53 constituted of the remaining part of the cylindrical portion 51 and the remaining part of the flange portion 52, so as to radially move with respect to the main portion 53 via the an elastically deformable portion 55.

Figure 4:
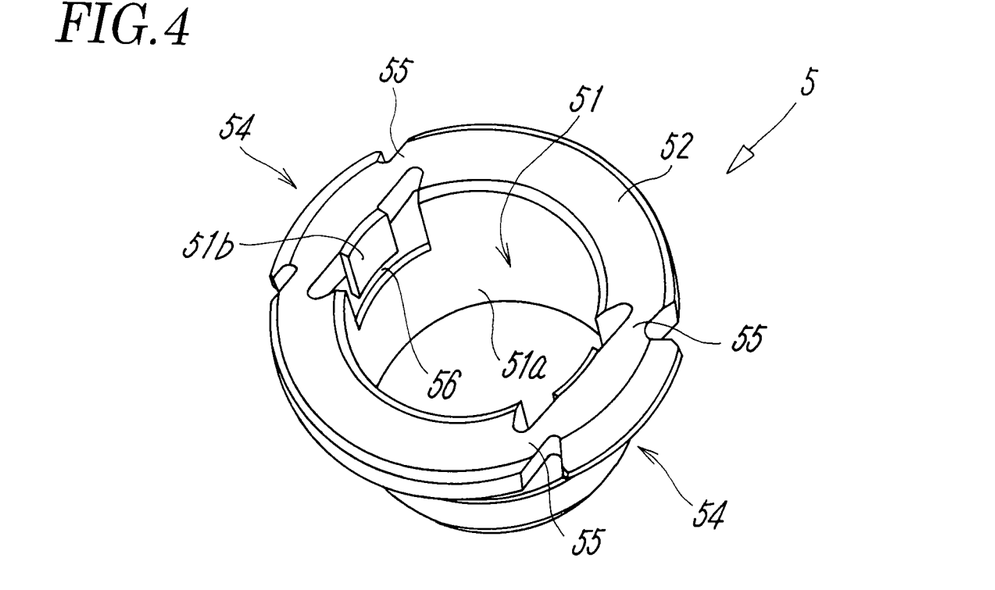
FIG. 4 is a perspective view showing a release bush according to the first embodiment.
Figure 5A:
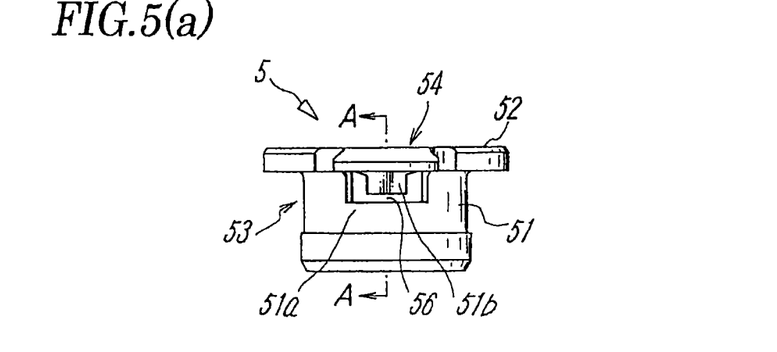
FIG. 5(a) is a side view showing a configuration of the release bush.
Figure 5B:
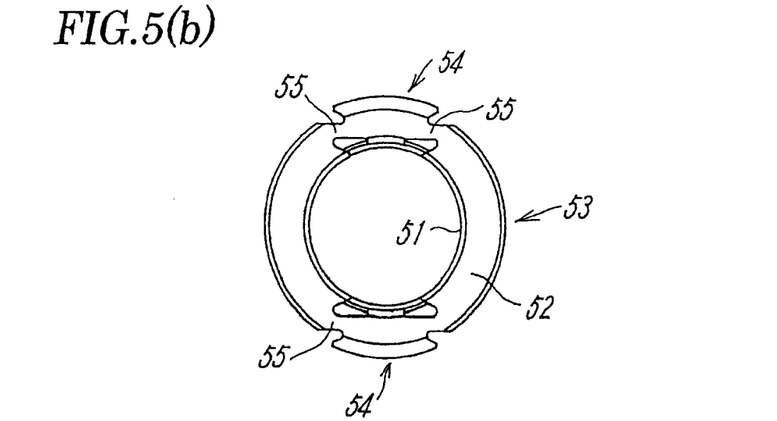
FIG. 5(b) is a plan view of the same.
Figure 5C:
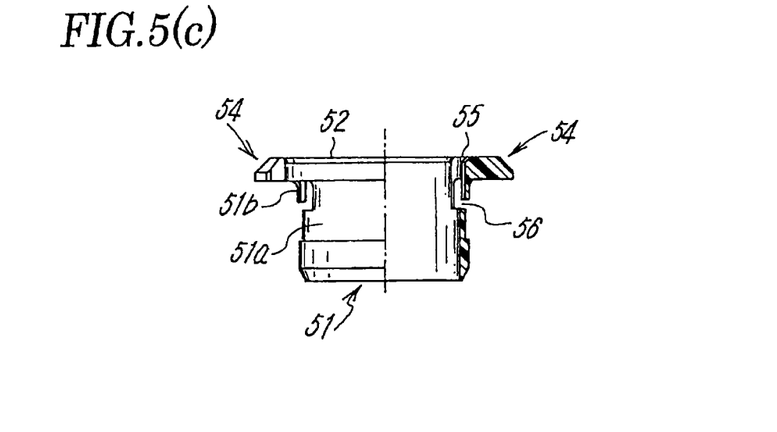
FIG. 5(c) is a partially cross-sectional front view taken along a line A-A in FIG. 5(a).
Figure 6:
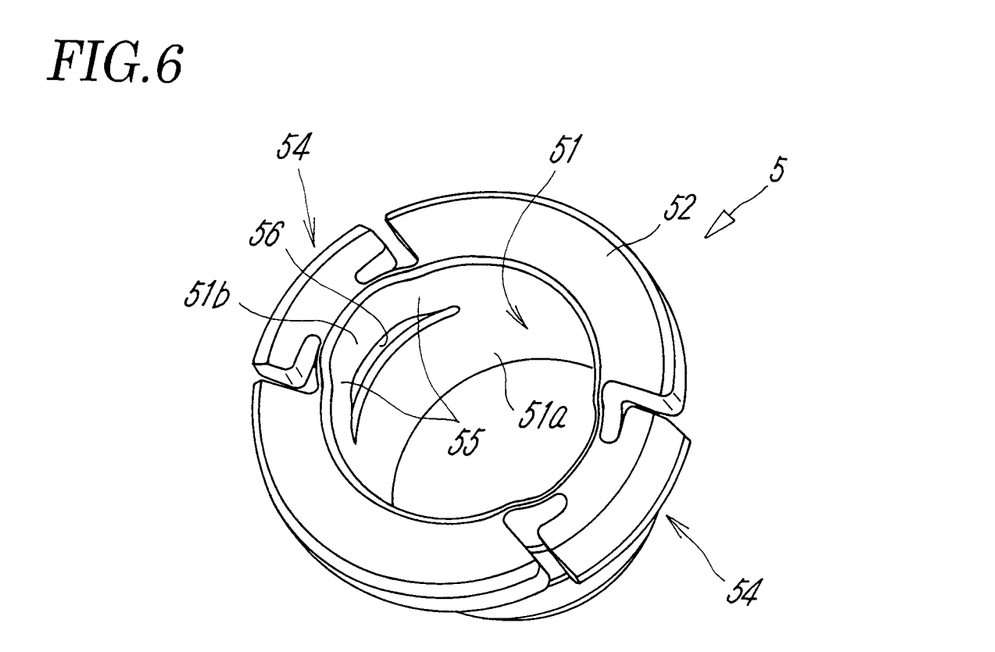
FIG. 6 is a perspective view showing a release bush of a pipe joint according to the second embodiment.
Figure 7A:
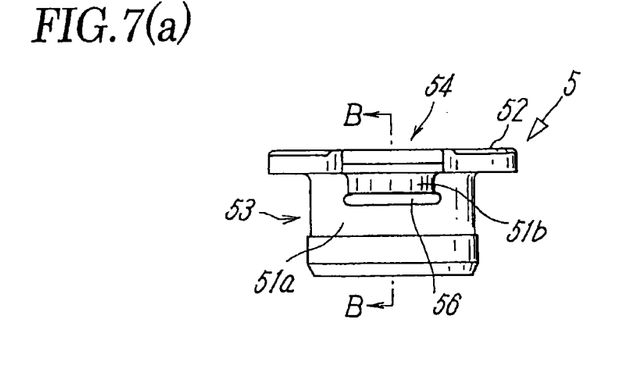
FIG. 7(a) is a side view showing a configuration of the release bush.
Figure 7B:
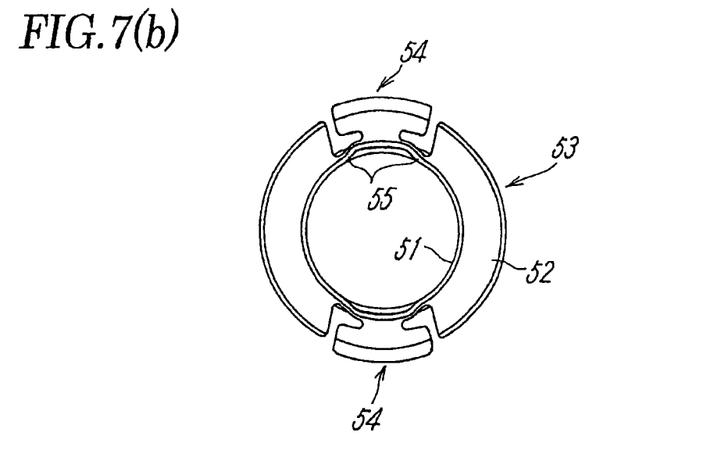
FIG. 7(b) is a plan view of the same.
Figure 7C:
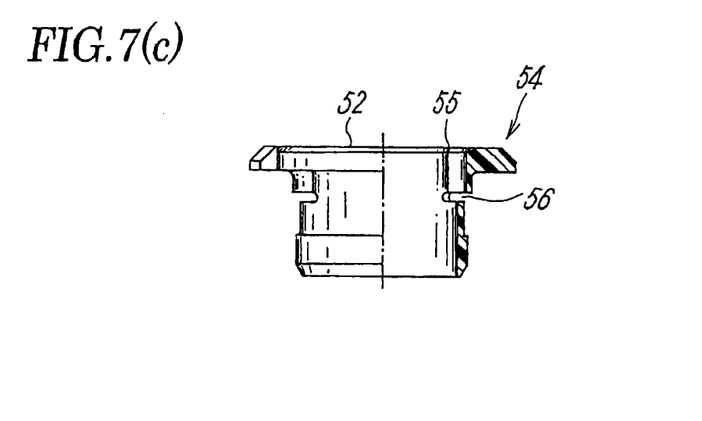
FIG. 7(c) is a partially cross-sectional front view taken along a line B-B in FIG. 7(a).

Here, although the pair of movable portions 54 according to this embodiment are located so as to oppose each other on the main portion 53, one to a plurality of movable portions 54 may be provided around the release bush 5.

To be more specific, a cylindrical portion 51b of the movable portion 54 can be moved so as to be aligned with the cylindrical portion 51a of the main portion 51 along the same circumference, when an external operating force is exerted on the movable portion 54 in a predetermined direction, for example when the worker grabs a pair of the movable portions 54 with fingers or a tool. On the other hand, when the movable portion 54 is free from an operating force, the movable portion 54 remains in a radially outer region of the cylindrical portion 51a of the main portion 51 because of the effect of the elastically deformable portion 55, so as to oppose the outer face of the flange of the guide member 1b of the main body 1, which inhibits the cylindrical portion 51 of the release bush 5 from being pressed into the chuck 21 despite the flange portion 52 being pressed.

Further, the main portion 53 and the movable portion 54 are partially separated from each other via a slit 56 formed in a circumferential direction at least along the cylindrical portion 51, such that a cut edge of the cylindrical portion 51b of the movable portion 54 defined by the slit 56 is located at a position opposing the guide member 1b of the main body 1, when an operating force is not applied.

While the elastically deformable portion 55 movably connecting the main portion 53 and the movable portion 54 may be located at a desired position, in this embodiment the main portion 53 and the movable portion 54 are connected via the elastically deformable portion 55 provided on the flange portion 52.

In contrast, in a second embodiment shown in FIGS. 6 and 7(a) to 7(c), the main portion 53 and the movable portion 54 are connected to each other via the elastically deformable portion 55 provided on the cylindrical portion 51. The main portion 53 and the movable portion 54 may also be connected via the elastically deformable portion 55 provided over a region including a part of the cylindrical portion 51 and a part of the flange portion 52. The configuration of the second embodiment other than the foregoing is the same as that of the first embodiment, and hence the same numerals are given to the constituents shown in FIGS. 6 and 7(a) to 7(c), and description thereof will not be repeated.

Figure 11:
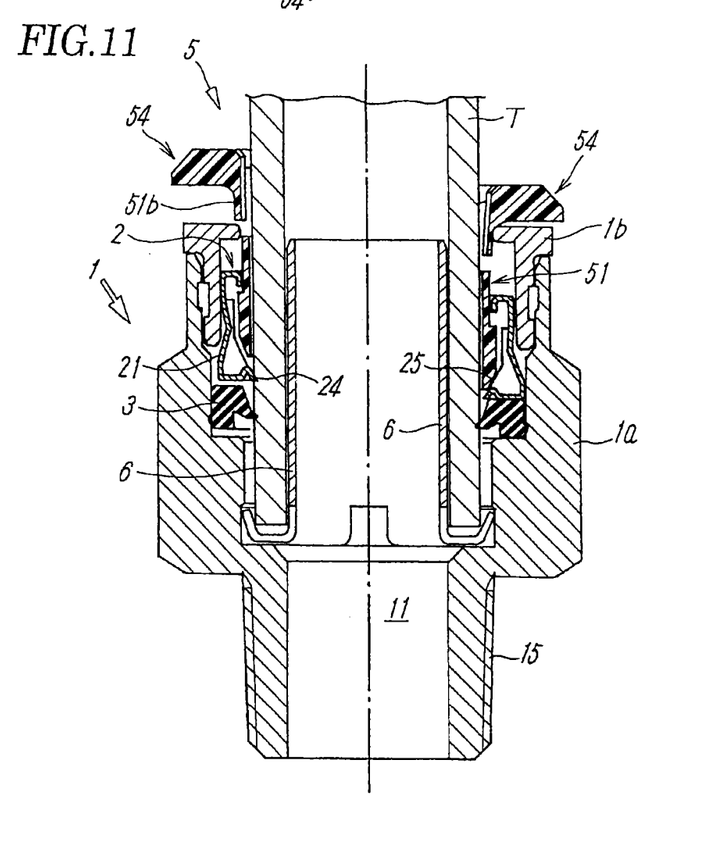
FIG. 11 is a cross-sectional view showing the pipe joint according to the first embodiment of the invention, in which the left half shows a state where the tube is inserted, and the right half shows a state where the release bush is pressed.

In the pipe joint according to the first embodiment, the tube T is inserted in the tube insertion clearance 13 as shown in the left half of FIG. 11, in which the latch claw 24 is engaged with the outer circumferential surface of the tube T, so that the tube T is retained in the inserted state.

In this state, even though the release bush 5 is subjected to a force exerted in a direction to press the release bush 5 into the main body 1 (direction to remove the tube T), for example by the worker's hand or another object, the cut edge of the cylindrical portion 51b of the movable portion 54 in the release bush 5 is made to abut the main body 1 so as to prevent the cylindrical portion 51 of the release bush 5 from being pressed into the tube insertion clearance 13 in the main body 1, thereby preventing the chuck 21 from being disengaged from the tube T, thus preventing the tube T from being accidentally removed.

On the other hand, referring to the right half of FIG. 11, upon holding the flange portions 52 of the movable portion 54 with fingers or a tool thereby moving the cylindrical portion 51 of the movable portion 54 so as to be aligned with the cylindrical portion 51a of the main portion 53 along the same circumference, and then pressing the flange portion 52 toward the main body 1 keeping the flange portions 52 held as above, the cylindrical portion 51b of the movable portion 54 is kept from abutting the main body 1, so that the cylindrical portion 51 of the release bush 5 can be pressed into the tube insertion clearance 13 and press-open the latch claw 24 of the chuck 21, thereby disengaging the chuck 21 from the tube T and allowing the tube T to be easily removed from the main body 1.

The configuration and operation of the release bush 5 of the second embodiment are the same as those of the first embodiment, and therefore the description thereof will not be repeated.

Figure 8:
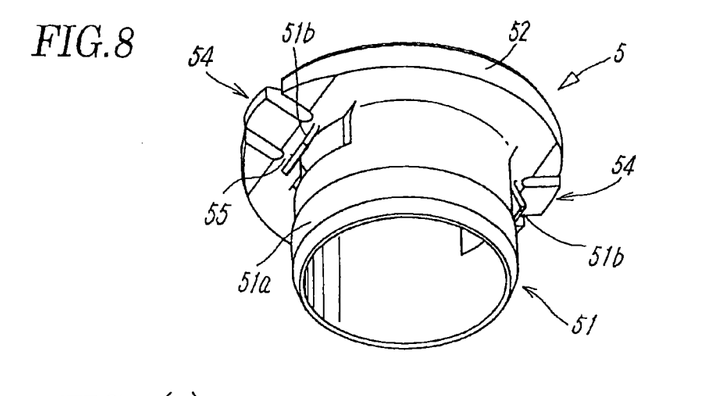
FIG. 8 is a perspective view showing a release bush of a pipe joint according to a third embodiment of the invention.

According to the first and the second embodiment, the main portion 53 and the movable portion 54 are connected so as to radially move with respect to each other via the elastically deformable portion 55 provided on the cylindrical portion 51 and the flange portion 52. Now, in a third embodiment shown in FIGS. 8 to 9(c), the cylindrical portion 51b of the movable portion 54 is formed so as to remain outwardly inclined with respect to the cylindrical portion 51a of the main portion 53 when an operating force is not applied, and the movable portion 54 is connected to the main portion 53 so as to rotationally move with respect thereto via the elastically deformable portion 55 provided on the flange portion 52. Thus, upon applying a downward operating force to the outer end portion of the flange portion 52 in the movable portion 54 thereby rotating the movable portion 54 via the elastically deformable portion 55, the cylindrical portion 51b of the movable portion 54 is caused to rotate in a direction indicated by an arrow in FIG. 9(c), so as to be aligned with the cylindrical portion 51a of the main portion 53 along the same circumference.

Figure 9A:
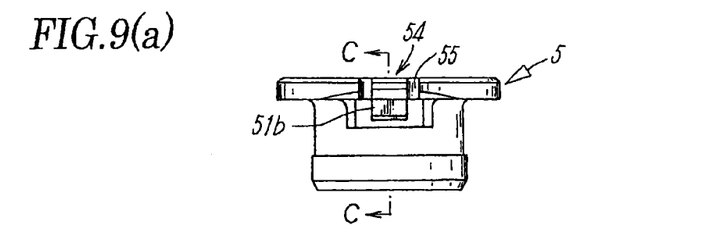
FIG. 9(a) is a side view showing a configuration of the release bush.
Figure 9B:
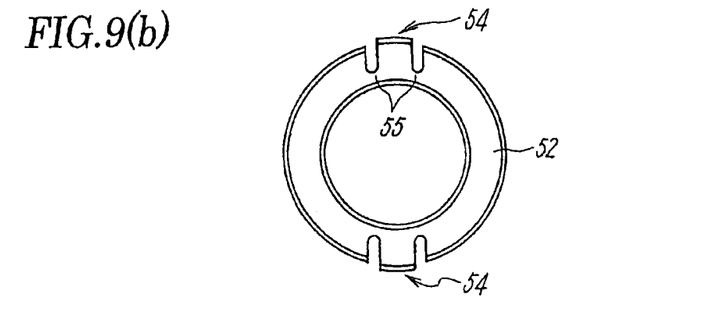
FIG. 9(b) is a plan view of the same.
Figure 9C:
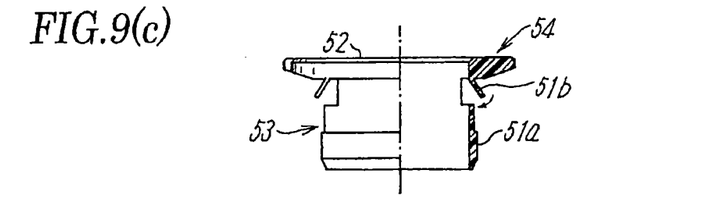
FIG. 9(c) is a partially cross-sectional front view taken along a line C-C in FIG. 9(a).

When the movable portion 54 is released from the external operating force, the cylindrical portion 51b of the movable portion 54 returns to the outer region of the cylindrical portion 51a of the main portion 53 shown in FIG. 9(c), so as to oppose the main body 1 as in the first embodiment and the second embodiment, which inhibits the cylindrical portion 51 of the release bush 5 from being pressed into the chuck 21 despite pressing the flange portion 52.

Although the main portion 53 and the movable portion 54 are movably connected via the elastically deformable portion 55 provided on the flange portion 52 in the third embodiment, the elastically deformable portion 55 may be provided between the cylindrical portions 51a and 51b.

Figure 10:
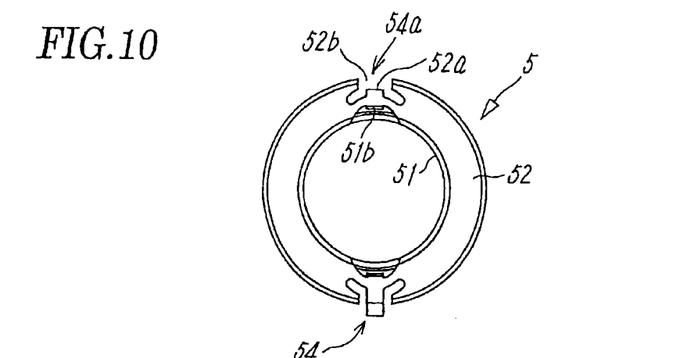
FIG. 10 is a plan view showing a pipe joint according to a fourth embodiment of the invention.

FIG. 10 shows a fourth embodiment, which is mechanically the same as the first embodiment, but in which some of a plurality of the movable portions 54 provided at a plurality of positions on a circumference of the release bush 5, for example a movable portion 54a in FIG. 10, includes a flange portion 52a for operation located inside a narrow recess 52b, which inhibits access to the flange portion 52a by a finger. Accordingly, although the remaining movable portions 54 can be pressed by fingers, the release bush 5 cannot be operated unless a screw driver or the like is utilized to intentionally press the flange portion 52a of the movable portion 54a, which substantially minimizes the risk that the tube T is accidentally removed.

The configuration and operation other than the foregoing are the same as those of the first embodiment, and therefore description thereof will not be repeated.

The invention claimed is:

1. A pipe joint comprising:
   a tube retention mechanism provided at an end portion of a fluid channel formed through a main body of the pipe joint, the tube retention mechanism including a chuck with a latch claw to be engaged with an outer circumferential surface of a tube inserted into the fluid channel so as to retain the tube; and
   a release bush to be inwardly pressed into the chuck to disengage the chuck from the tube thereby allowing the tube to be removed,
   wherein the release bush includes a cylindrical portion corresponding to an outer circumference of a tube insertion clearance in the main body and a flange portion for pressing formed along an outer edge of the release bush and located outside the main body, the cylindrical portion and the flange portion being integrally formed as a single component made of a synthetic resin,
   a part of the flange portion and a part of the cylindrical portion form a movable portion of the release bush that is movable with respect to a main portion of the release bush including a remaining part of the flange portion and a remaining part of the cylindrical portion via an elastically deformable portion of the release bush, the movable portion of the release bush having a latch piece including a part of the cylindrical portion,
   when an external operating force is applied to the movable portion of the release bush, the latch piece thereof is movable so as to be aligned with the cylindrical portion of the main portion of the release bush along the same circumference; and
   when the external operating force is not applied to the movable portion, the latch piece is located in a radially outer region of the cylindrical portion of the main portion of the release bush so as to oppose a portion of the main body, thereby inhibiting the release bush from being pressed into the chuck despite the flange portion being pressed.

2. The pipe joint according to claim 1,
   wherein the movable portion and the main portion of the release bush are partially separated from each other via a slit provided in the cylindrical portion in a circumferential direction, such that a distal end portion of the latch piece of the movable portion of the release bush defined by the slit is located at a position opposing the main body when the external operating force is not applied.

3. The pipe joint according to claim 1,
   wherein the movable portion of the release bush is connected to the main portion of the release bush so as to radially move with respect thereto, via the elastically deformable portion provided on the flange portion.

4. The pipe joint according to claim 2,
   wherein the movable portion of the release bush is connected to the main portion of the release bush so as to radially move with respect thereto, via the elastically deformable portion provided on the flange portion.

5. The pipe joint according to claim 1,
   wherein the movable portion of the release bush is provided at a plurality of positions which are symmetrical to each other on a circumference of the release bush.

6. The pipe joint according to claim 2,
   wherein the movable portion of the release bush is provided at a plurality of positions which are symmetrical to each other on a circumference of the release bush.

7. The pipe joint according to claim 3,
   wherein the movable portion of the release bush is provided at a plurality of positions which are symmetrical to each other on a circumference of the release bush.

8. The pipe joint according to claim 4,
   wherein the movable portion of the release bush is provided at a plurality of positions which are symmetrical to each other on a circumference of the release bush.

9. A pipe joint comprising:
   a tube retention mechanism provided at an end portion of a fluid channel formed through a main body of the pipe joint, the tube retention mechanism including a chuck with a latch claw to be engaged with an outer circumferential surface of a tube inserted into the fluid channel so as to retain the tube; and
   a release bush to be inwardly pressed into the chuck to disengage the chuck from the tube thereby allowing the tube to be removed,
   wherein the release bush includes a cylindrical portion corresponding to an outer circumference of a tube insertion clearance in the main body and a flange portion for pressing formed along an outer edge of the release bush and located outside the main body, the cylindrical portion and the flange portion being integrally formed as a single component made of a synthetic resin,
   a part of the flange portion and a part of the cylindrical portion form a movable portion of the release bush that is movable with respect to a main portion of the release bush including a remaining part of the flange portion and a remaining part of the cylindrical portion via an elastically deformable portion of the release bush, the movable portion of the release bush having a latch piece including a part of the cylindrical portion,
   the latch piece of the movable potion of the release bush that is separated from the cylindrical portion of the main portion of the release bush via a slit extending to a circumferential direction of the release bush, is disposed between two elastically deformable portions being in different positions of the circumferential direction of the release bush, and has an end portion of the slit side, and
   the end portion of the latch piece engages with the main body at a position outside the cylindrical portion of the main portion when an operating force is not applied to the movable portion, and the end portion of the latch piece moves so as to be aligned with the cylindrical portion of the main portion along the same circumference in accordance with a deformation of the elastically deformable portions when the operating force is applied to the movable portion.

10. The pipe joint according to claim 9,
wherein the movable portion of the release bush is connected to the main portion of the release bush so as to radially move with respect thereto, via the elastically deformable portion provided on the flange portion.

11. The pipe joint according to claim 9,
wherein the movable portion of the release bush is provided at a plurality of positions which are symmetrical to each other on a circumference of the release bush.

* * * * *